United States Patent
Siegel et al.

(10) Patent No.: US 8,904,212 B2
(45) Date of Patent: Dec. 2, 2014

(54) POWER MANAGEMENT UTILIZING PROXIMITY OR LINK STATUS DETERMINATION

(71) Applicant: Plantronics, Inc., Santa Cruz, CA (US)

(72) Inventors: Jeffrey Siegel, Los Gatos, CA (US); Douglas K Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 13/931,638

(22) Filed: Jun. 28, 2013

(65) Prior Publication Data
US 2013/0297958 A1 Nov. 7, 2013

Related U.S. Application Data

(63) Continuation-in-part of application No. 12/623,256, filed on Nov. 20, 2009, now Pat. No. 8,484,494.

(51) Int. Cl.
| | |
|---|---|
| *G06F 1/32* | (2006.01) |
| *G06F 1/00* | (2006.01) |
| *G08B 21/00* | (2006.01) |
| *G06F 3/038* | (2013.01) |
| *H04B 7/00* | (2006.01) |
| *H04B 17/00* | (2006.01) |
| *H04M 1/00* | (2006.01) |
| *G01R 15/00* | (2006.01) |
| *G06F 3/00* | (2006.01) |
| *G06F 13/42* | (2006.01) |
| *H04W 52/02* | (2009.01) |
| *H04W 52/28* | (2009.01) |

(52) U.S. Cl.
CPC ............. *G06F 1/325* (2013.01); *G06F 1/3203* (2013.01); *H04W 52/0229* (2013.01); *G06F 1/3209* (2013.01); *H04W 52/283* (2013.01); *H04W 52/288* (2013.01)
USPC ........ 713/320; 713/300; 713/310; 340/686.6; 345/211; 370/310; 455/226.2; 455/574; 702/57; 710/15; 710/106

(58) Field of Classification Search
CPC ............................. G06F 1/325; G06F 1/3209
USPC ........ 713/300, 310, 320; 340/686.6; 345/211; 370/310; 455/226.2, 574; 702/57; 710/15, 106
See application file for complete search history.

(56) References Cited

U.S. PATENT DOCUMENTS

| | | |
|---|---|---|
| 5,010,566 A | 4/1991 | Seo |
| 6,320,822 B1 | 11/2001 | Okeya et al. |
| 6,802,016 B2 | 10/2004 | Liu |
| 7,010,710 B2 | 3/2006 | Piazza |
| 7,900,070 B2 * | 3/2011 | Wu et al. ........................ 713/320 |
| 7,945,297 B2 | 5/2011 | Phillipp |
| 8,352,768 B2 * | 1/2013 | Starr et al. .................... 713/323 |
| 2001/0018329 A1 | 8/2001 | Tada et al. |

(Continued)

OTHER PUBLICATIONS

Geere, "Philips Launches PowerSensor LCD Monitor," Pocket Lint, Jun. 26, 2009, found at URL <http://www.pocket-lint.com/news/25124/philips-launches-powersensor-lcd-monitor#>.

*Primary Examiner* — Stefan Stoynov
(74) *Attorney, Agent, or Firm* — Chuang Intellectual Property Law

(57) ABSTRACT

Methods and apparatuses for power management are disclosed. In one example, proximity of link status of a wireless communication device is used to determine whether a power conservation mode is implemented.

25 Claims, 15 Drawing Sheets

(56) References Cited

U.S. PATENT DOCUMENTS

| | | |
|---|---|---|
| 2002/0016188 A1 | 2/2002 | Kashiwamura |
| 2002/0021278 A1 | 2/2002 | Hinckley et al. |
| 2002/0065625 A1 | 5/2002 | Xydis |
| 2005/0221791 A1 | 10/2005 | Angelhag |
| 2006/0013079 A1 | 1/2006 | Rekimoto |
| 2007/0238484 A1* | 10/2007 | Liu .............................. 455/557 |
| 2009/0245152 A1 | 10/2009 | Hsu et al. |
| 2010/0120406 A1 | 5/2010 | Banga et al. |
| 2011/0309921 A1* | 12/2011 | Tachibana ................. 340/425.1 |

* cited by examiner

US 8,904,212 B2

POWER MANAGEMENT UTILIZING PROXIMITY OR LINK STATUS DETERMINATION

CROSS REFERENCE TO RELATED APPLICATIONS

The present application is a continuation-in-part application of U.S. patent application Ser. No. 12/623,256 for "Power Management Utilizing Proximity or Link Status Determination," filed on Nov. 20, 2009, the entire disclosure of which is incorporated herein by reference for all purposes.

BACKGROUND OF THE INVENTION

Power consumption of electrical devices in the office or home can be significant. In many instances, devices such as computers remain on for the entire work day, and in some instances, continuously for twenty four hours everyday. In addition to the computers themselves, attached computer peripherals such as display devices and printers also consume significant amounts of power and often remain powered on regardless of the operating state of the computers. Additional example devices requiring power in the home or office include copiers, fax machines, environmental systems, and lighting systems. As energy costs increase, it is desirable to reduce unnecessary power consumption in such devices.

As a result, improved methods and apparatuses for power management of electrical devices are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
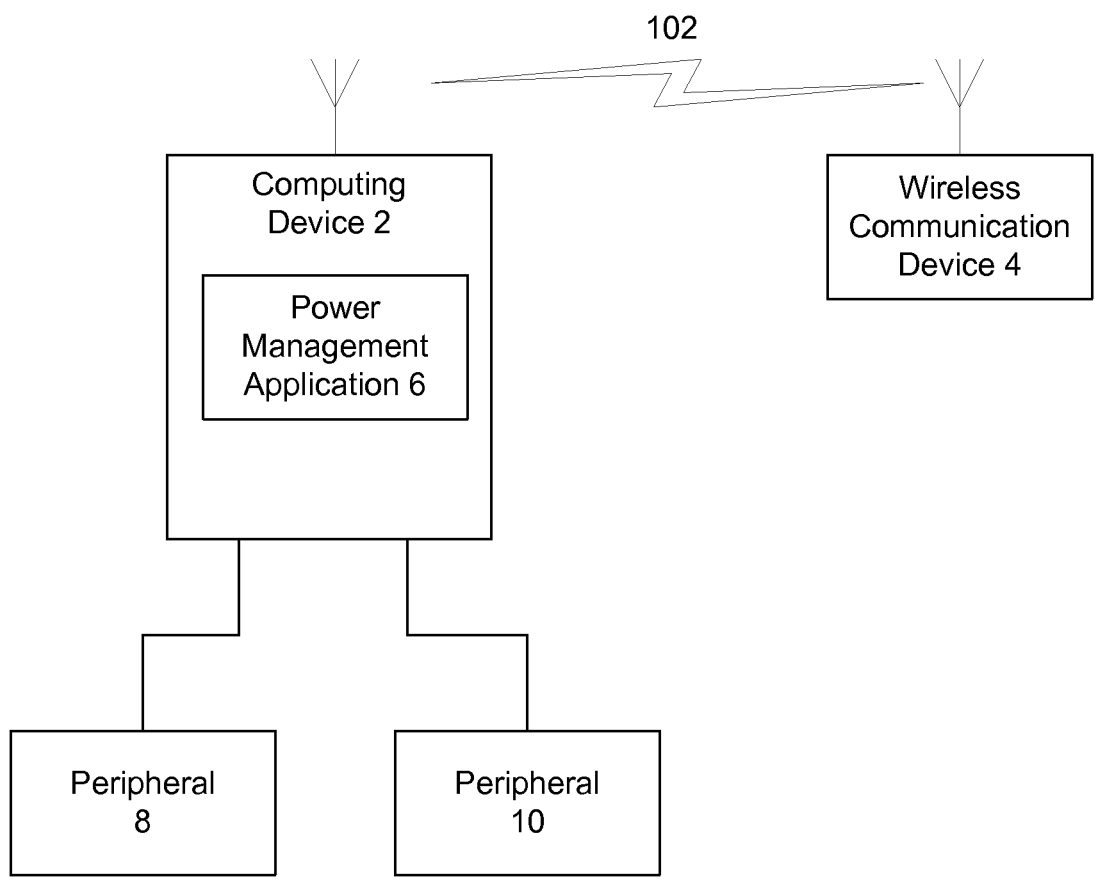
FIG. 1 illustrates system for power management using a computing device in wireless communication with a wireless communication device.

Methods and apparatuses for power management utilizing proximity determination or link connection status are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to power management of electrical devices, such as computers, computer peripherals, copiers, environmental systems, and lighting systems. In the prior art, many computer systems utilize power management software that operates using a timer based power management scheme. For example, upon a period of user inactivity at the computer input devices, the power management software initiates some form of power save function, such as automatically turning the display off or placing the computer in a standby mode. Upon detection of user activity at an input device such as the keyboard or mouse, the display is turned on or the computer leaves standby mode to resume normal operation.

The inventors have recognized that while timer based power management schemes may be effective to a certain extent, such schemes do not maximize potential power savings as power consumption continues for a period of time when a user has left the proximity of the computer or other electrical device. Furthermore, the inventors have recognized that effective schemes for determining proximity are needed for proximity based power management to be effective.

In one example of the invention, a proximity sensing system for power management includes a wireless communication device in combination with a computer and/or wireless base station. The wireless communication device is capable of forming a wireless link with the personal computer or base station. A power management application on the computer processes RSSI data associated with the wireless communication device. In one example implementation, the RSSI data is processed to determine whether the wireless communication device is in close proximity to the computer (referred to herein as a NEAR state) or far proximity to the computer (referred to herein as a FAR state). In one example implementation, the connection status of the wireless link between the wireless communication device and computer is monitored to determine either a link present state or no-link state.

Based on the proximity of the wireless communication device, the power management application implements energy saving measures by shutting off or invoking power-save mode at the computer or at the computer's attached peripheral devices. For example, the power management application may dim the computer monitor when either a FAR state or no-link state is detected. The power management application returns the devices to normal operating mode when the wireless communication device returns to a NEAR state and/or a connected state.

In addition, the power management application at the computer can report the wireless communication device state (i.e., the user presence state) to other devices. For example, the wireless communication device state can be reported to a power management server. The power management server can utilize the wireless communication device state information to implement power management at electrical devices in the user facility. For example, the power management server may turn off the lighting systems in the user's office based on the wireless communication device state information. Furthermore, upon receiving and processing information about several wireless communication devices, the power management server may determine inactive areas of the facility and responsively reduce energy consumption of shared devices such as copiers and environmental systems such as heating, air conditioning, or ventilation.

In one example, a computing device includes a wireless transceiver adapted to receive a wireless signal from a wireless communication device, an input/output interface adapted to interface with a peripheral device, a processor, and a memory. The memory stores a power management application configured to monitor a wireless communication device proximity utilizing an RSSI value associated with the wireless signal and responsive to the wireless communication device proximity operate the computing device in a normal operation mode or a power conservation mode.

In one example, a computing device includes a wireless transceiver adapted to receive a wireless signal from a wireless communication device, an input/output interface adapted to interface with a peripheral device, a processor, and a memory. The memory stores a power management application configured to monitor a wireless communication device link connection status and responsive to the wireless communication device link connection status operate the computing device in a normal operation mode or a power conservation mode.

In one example, a method for power conservation includes receiving at a computing device RSSI data associated with a signal received from a wireless communication device and processing the RSSI data to identify a wireless communication device proximity. The method further includes switching from a normal operation mode to a power conservation mode responsive to the wireless communication device proximity satisfying a first predetermined condition, and switching from the power conservation mode to the normal operation mode responsive to the wireless communication device proximity satisfying a second predetermined condition.

In one example, a power management system includes a powered network device disposed in a geographical region and a computing device disposed in the geographical region. The computing device includes a wireless transceiver adapted to receive a wireless signal from a wireless communication device, a processor, and a memory storing a monitoring application configured to monitor a wireless communication device proximity utilizing an RSSI value associated with the wireless signal and responsive to the wireless communication device proximity generate a normal operation mode status indicator or a power conservation mode status indicator. The power management system further includes a power management server having a power management application adapted to receive from the computing device the normal operation mode status indicator or the power conservation mode status indicator and responsively operate the powered network device in a power conservation mode or a normal operation mode.

FIG. 1 illustrates an example system for power management 100 using a computing device 2 in wireless communication with a wireless communication device 4 over a wireless link 102. The computing device 2 includes a power management application 6. In the example shown in FIG. 1, computing device 2 interfaces with a peripheral device 8 and peripheral device 10. Although only two peripheral devices are shown, computing device 2 may interface with any number of peripheral devices. Wireless link 102 may be implemented using a variety of wireless communication protocols including, for example, Bluetooth, digital enhanced cordless telecommunications (DECT), IEEE 802.11, or infrared (IR). Peripheral device 8 and peripheral device 10 are any type of device which may be connected to a computing device and include, for example, printers and display devices. Computing device 2 may, for example, be a desktop computer or laptop computer. Wireless communication device 4 may, for example, be a wireless headset or a mobile phone.

In one example mode of operation, the power management application 6 monitors the proximity of wireless communication device 4 to computing device 2 by processing received signal strength indication (RSSI) data associated with the wireless link 102. Responsive to the proximity of wireless communication device 4, power management application 6 operates the computing device 2 in a power conservation mode or a normal operation mode. For example, in power conservation mode, one or more powered components of computing device 2 enter a low power state of operation. In a further example, in power conservation mode, peripheral device 8 or peripheral device 10 are instructed to enter a low power state of operation.

In a further example mode of operation, the power management application 6 monitors the wireless link status of wireless link 102. Responsive to the wireless link status, power management application 6 operates the computing device 2 in a power conservation mode or a normal operation mode.

In yet another example mode of operation, the power management application 6 monitors both the proximity of wireless communication device 4 to computing device 2 and wireless link status of wireless link 102. Responsive to the proximity of wireless communication device 4, the status of wireless link 102, or both the proximity of wireless communication device 4 and the status of wireless link 102, power management application 6 operates the computing device 2 in a power conservation mode or a normal operation mode.

Figure 2:
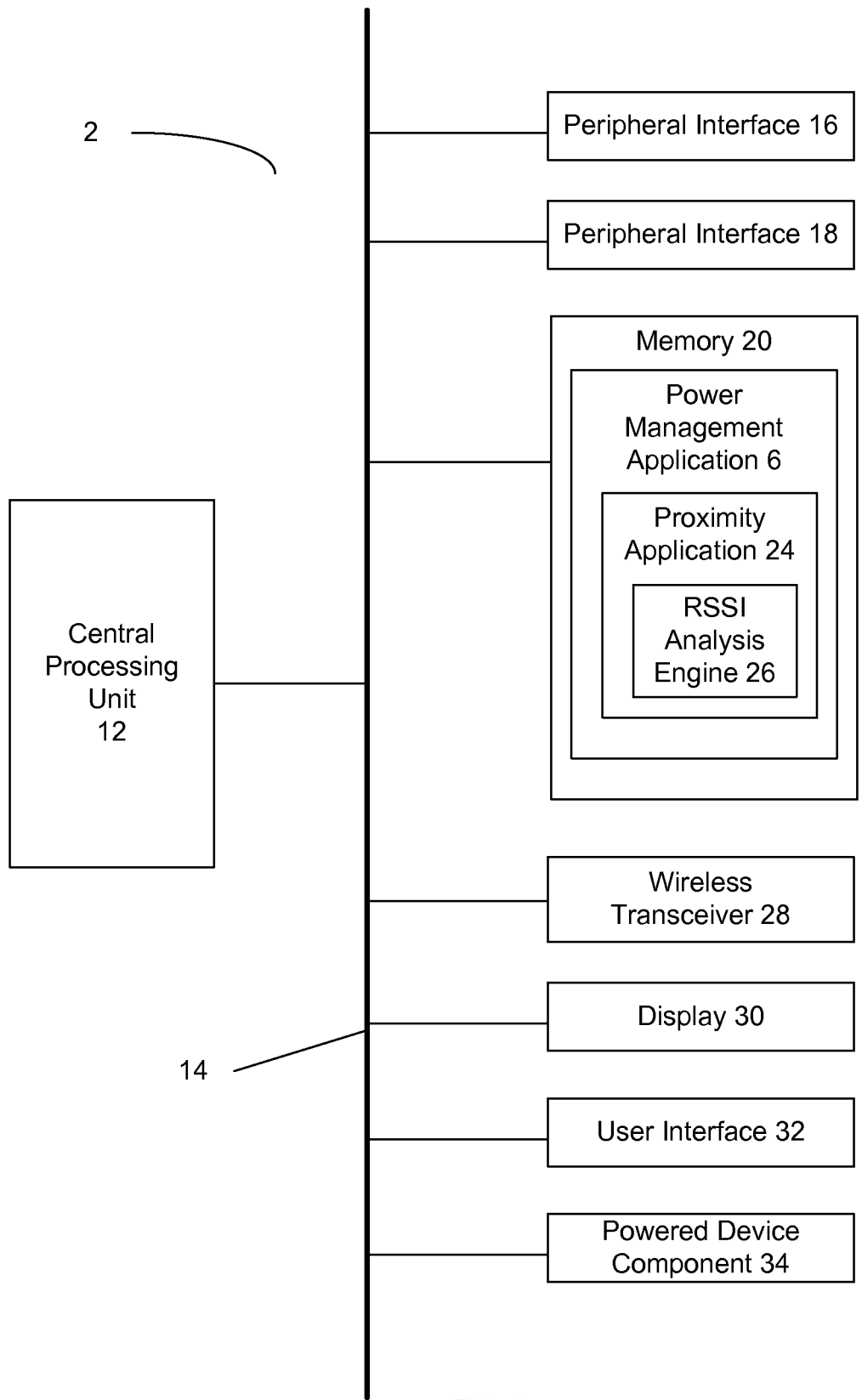
FIG. 2 illustrates a block diagram of the computing device with a power management application shown in FIG. 1 in one example.

FIG. 2 illustrates a block diagram of the computing device 2 shown in FIG. 1 in one example. Computing device 2 includes a central processing unit 12 operably coupled via a bus 14 to a peripheral interface 16, peripheral interface 18, memory 20, wireless transceiver 28, display 30, user interface 32, and powered device component 34. Wireless transceiver 28 may for example, be a DECT transceiver, Bluetooth transceiver, or IEEE 802.11 transceiver. Wireless transceiver 28 is adapted to receive a wireless signal from the wireless communication device 4. Although shown as integrated with computing device 2, wireless transceiver 28 may be coupled to computing device 2 via peripheral interface 16 or 18. For example, wireless transceiver 28 may be disposed at a USB dongle or a headset base. User interface 32 allows for communication between a user and the computing device 2, and in one example includes an audio and/or visual interface.

Peripheral interface 16 and peripheral interface 18 may be any type of computer input/output (I/O) interface and/or network interface. For example, peripheral interface 16 and peripheral interface 18 may be a USB interface, DVI interface, HDMI interface, Firewire interface, parallel port, serial port, VGA port, or Ethernet port.

Central processing unit 12 allows for processing data, including managing RSSI data between wireless transceiver 28 and memory 20 for determining the proximity of wireless communication device 4. Central processing unit 12 may include a variety of processors (e.g., digital signal processors). Memory 20 may include a variety of memories, and in one example includes SDRAM, ROM, flash memory, or a combination thereof. Memory 20 may further include separate memory structures or a single integrated memory structure.

Memory 20 stores a power management application 6. The power management application 6 includes a proximity application 24, where the proximity application 24 utilizes an RSSI analysis engine 26. Power management application 6 is executed by central processing unit 12 to monitor a wireless communication device proximity and responsive to the wireless communication device proximity operate the computing device in a normal operation mode or a power conservation mode. Memory 20 may store RSSI values for use by proximity application 24 and RSSI analysis engine 26 to determine the proximity of wireless communication device 4.

In one example operation, the proximity application 24 monitors the received signal strength indicator (RSSI) of the wireless link 102 and processes the RSSI data using RSSI analysis engine 26 to determine the proximity of the wireless communication device 4 from the computing device 2. The RSSI can be measured and monitored either at the wireless communication device 4 or at the computing device 2. If measured and monitored at the wireless communication device 4, the computing device 2 can be configured to query the wireless communication device 4 for the RSSI data.

Proximity management application 6 compares the proximity of the wireless communication device 4 to a predetermined threshold proximity and responsively operates the computing device 2 in a normal operation mode or a power conservation mode. In one example, the predetermined threshold proximity is user configurable. In one example, the computing device is operated in the normal operation mode when the wireless communication device proximity is less than the predetermined threshold proximity and operated in the power conservation mode when the wireless communication device proximity is greater than the predetermined threshold proximity.

Where the wireless communication device proximity is less than the predetermined threshold proximity, the wireless communication device 4 may be considered to have a NEAR status and is operated in a normal operation mode. Where the wireless communication device proximity is greater than the predetermined threshold proximity, the wireless communication device 4 may be considered to have a FAR status and is operated in a power conservation mode. In one example operation, proximity application 24 compares received RSSI data to a threshold RSSI value to determine the wireless communication device proximity and generate a NEAR status indication or a FAR status indication. The threshold RSSI value is a value above which the wireless communication device 4 is in a NEAR status and below which the headset is in a FAR status.

In further examples, a proximity application 24 can reside on either or both the wireless communication device 4 and the computing device 2. Regardless of where the proximity application 24 resides, the result of a NEAR/FAR determination may be sent to the other device.

In one example, the power conservation mode includes sending a power conservation signal to a peripheral device via peripheral interface 16 or peripheral interface 18. For example, the peripheral device may be a display or printer. In one example, the power conservation mode includes operating a powered device component 34 in a low power state. For example, the powered device component is a display or a storage device.

Figure 3:
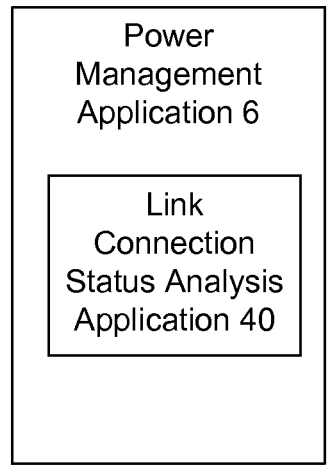
FIG. 3 illustrates a further example of a power management application residing on a computing device.

FIG. 3 illustrates a further example of a power management application 6 residing on computing device 2. Power management application 6 is executed by central processing unit 12 to monitor the link connection status of wireless link 102 and responsive to the link connection status operate the computing device in a normal operation mode or a power conservation mode. For example, the computing device is operated in the normal operation mode when the wireless communication device link connection status is a linked status and operated in the power conservation mode when the wireless communication device link status is a no-link status.

Figure 4:
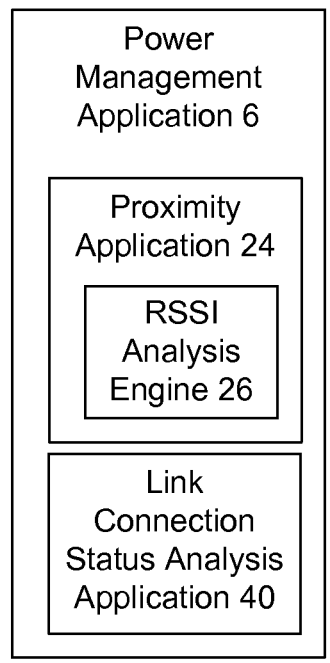
FIG. 4 illustrates a further example of a power management application residing on a computing device.

FIG. 4 illustrates a further example of a power management application 6 residing on computing device 2. Power management application 6 is executed by central processing unit 12 to monitor both the proximity of wireless communication device 4 and the link connection status of wireless link 102 and responsive to both the wireless communication device link connection status and the wireless communication device proximity status operate the computing device in a normal operation mode or a power conservation mode. In one example, the power management application 6 is configured to operate the computing device 2 in a power conservation mode when the link connection status is a no-link status and the mobile communication device proximity is greater than a predetermined threshold proximity. In one implementation, the user may select power management application 6 to operate based on proximity, link connection status, or both.

In one example, the wireless communication device 4 includes a sensor, such as an accelerometer, for determining whether the device is worn on the body (either donned on the user ear or being carried) or has been placed on a stationary object (referred to herein as a ditched state). The worn state is transmitted from the wireless communication device 4 to the computing device 2, and the power management application 6 utilizes the information in operating the wireless communication device 4 in power conservation mode or normal operation mode. Sensors for determining the worn state of a wireless communication device are described, for example, in the commonly assigned and co-pending patent applications entitled "Donned and Doffed Headset State Detection", application Ser. No. 11/542,385, which was filed on Oct. 2, 2006, and "Device Wearing Status Determination", application Ser. No. 12/603,466, which was filed on Oct. 21, 2009, which are hereby incorporated into this disclosure by reference for all purposes. In this scenario, a prerequisite for power management using power management application 6 is that the wireless communication device 4 be determined to be in a worn state. For example, where the wireless communication device 4 is determined to be in a ditched state, the power management application 6 may suspend power management of the computing device based on the wireless communication device proximity or link status.

Figure 5A:
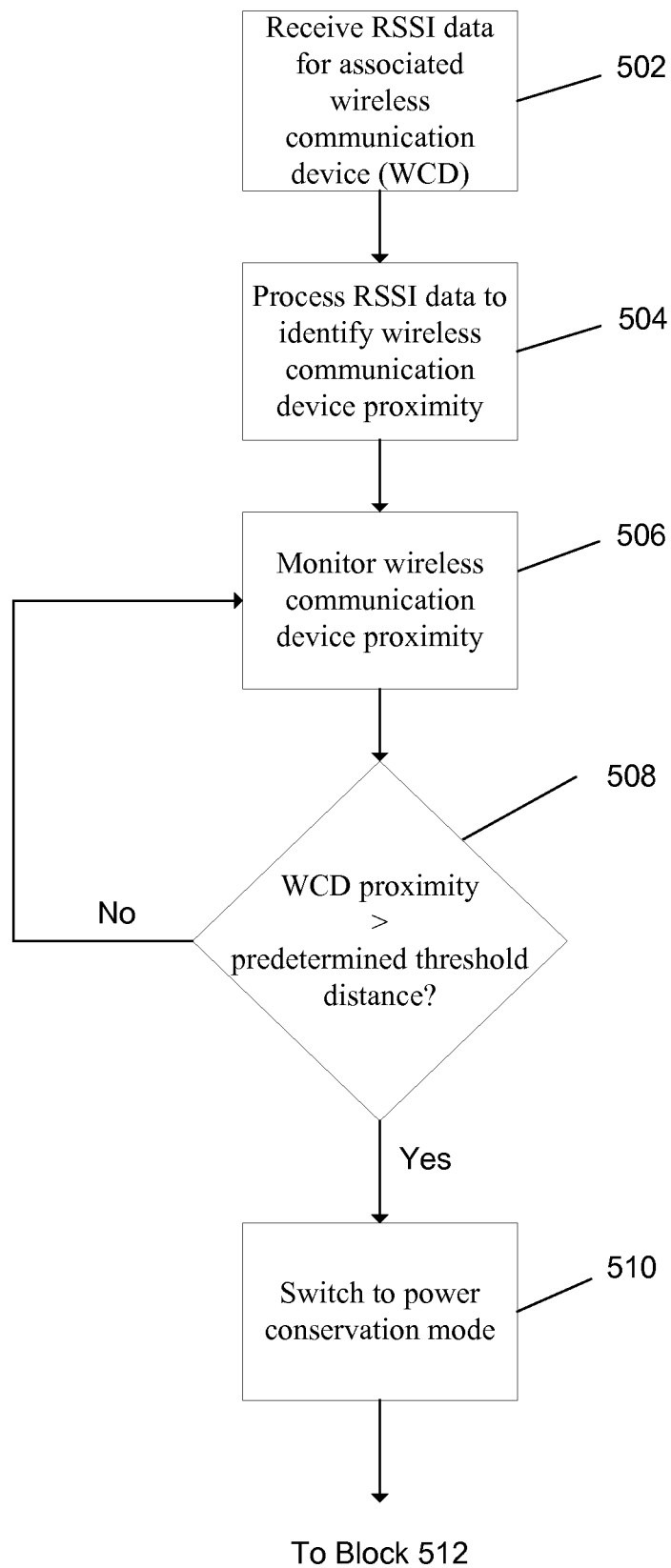
FIGS. 5A-5B are a flowchart illustrating a process by which power management is implemented by monitoring a wireless communication device proximity using RSSI data.
Figure 5B:
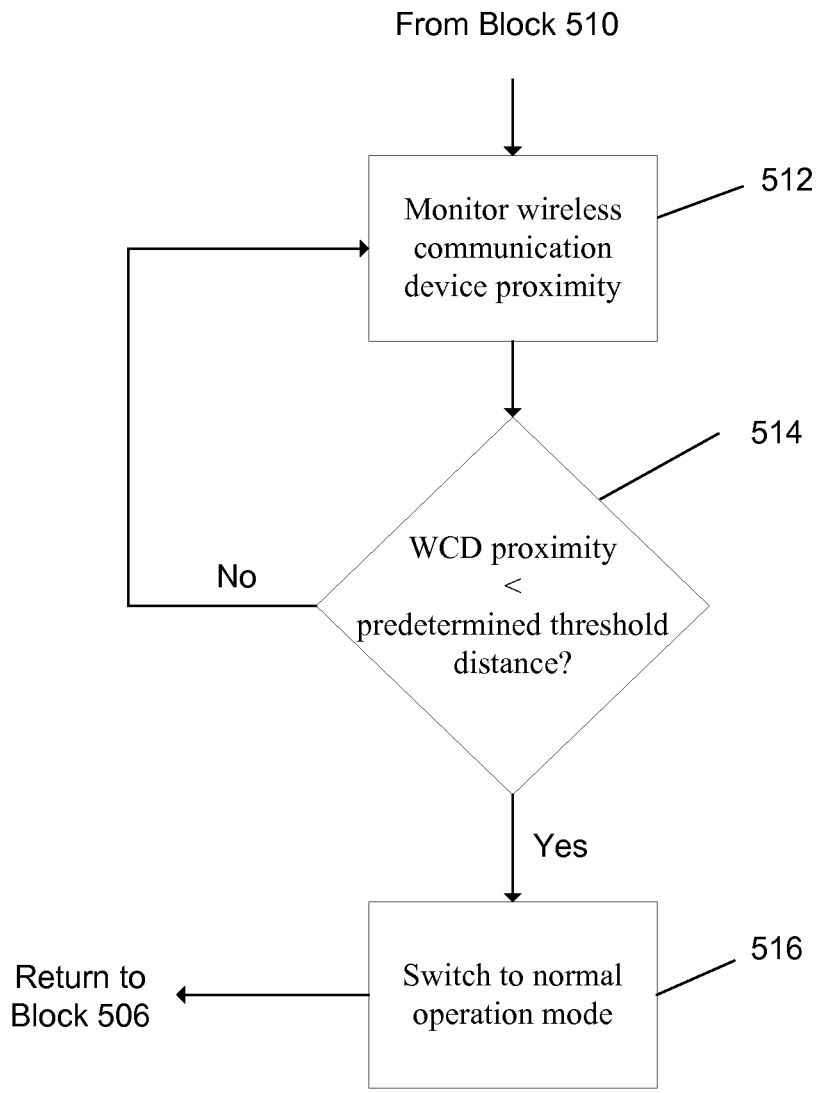

FIGS. 5A-5B are a flowchart illustrating a process by which power management is implemented at a computing device by monitoring a wireless communication device proximity using RSSI data. At block 502, RSSI data is received associated with a signal received from a wireless communication device. In one example, worn state data of the wireless communication device is also received indicating whether the wireless communication device is in a worn state or in a ditched state. If the wireless communication device is in a worn state, the process proceeds to block 504. If the wireless communication device is in a ditched state, the process is suspended and the worn state is monitored until a worn state is detected. In an example where worn state data is not received, the process proceeds to block 504 after block 502.

At block 504, the RSSI data is processed to identify a wireless communication device proximity. At block 506, the wireless communication device proximity is monitored. At decision block 508, it is determined whether the wireless communication device proximity is greater than a predetermined threshold distance. If no at decision block 508, the process returns to block 506.

If yes at decision block 508, at block 510, a switch to power conservation mode is made. In one example, switching to the power conservation mode includes sending a power conservation signal to a peripheral device coupled to the computing device. The power conservation signal instructs the peripheral device to enter a low power state. In a further example, switching to the power conservation mode includes initiating a low power operation mode of a computing device powered component. In one example, the power management application may incorporate hysteresis in processing the RSSI data to determine whether to switch between normal operation mode and power conservation mode to prevent rapid switching between modes. For example, the wireless communication device proximity may be required to be greater than the predetermined threshold distance for a pre-determined amount of time before a switch is made. A method for utilizing hysteresis when processing RSSI values to determine proximity is described, for example, in the commonly assigned and co-pending patent application entitled "Near Far Sensing Using Frequency Swept RSSI", application Ser. No. 11/906,670, which was filed on Oct. 2, 2007, and which is hereby incorporated into this disclosure by reference for all purposes.

At block 512, the wireless communication device proximity is monitored. At decision block 514, it is determined whether the wireless communication device proximity is less than a predetermined threshold distance. If no at decision block 514, the process returns to block 512. If yes at decision block 514, at block 516, a switch to normal operation mode is made. Following block 516, the process returns to block 506.

Figure 6A:
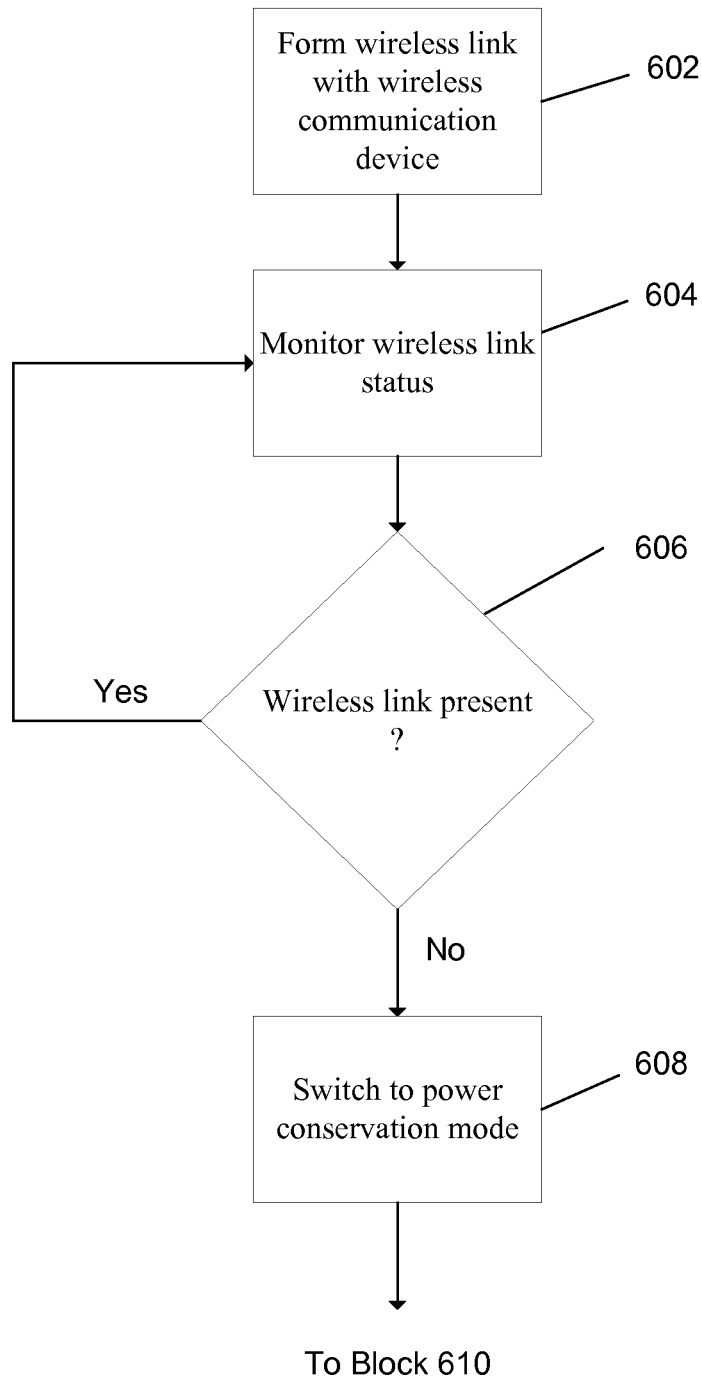
FIGS. 6A-6B are a flowchart illustrating a process by which power management is implemented by monitoring a link connection status.
Figure 6B:
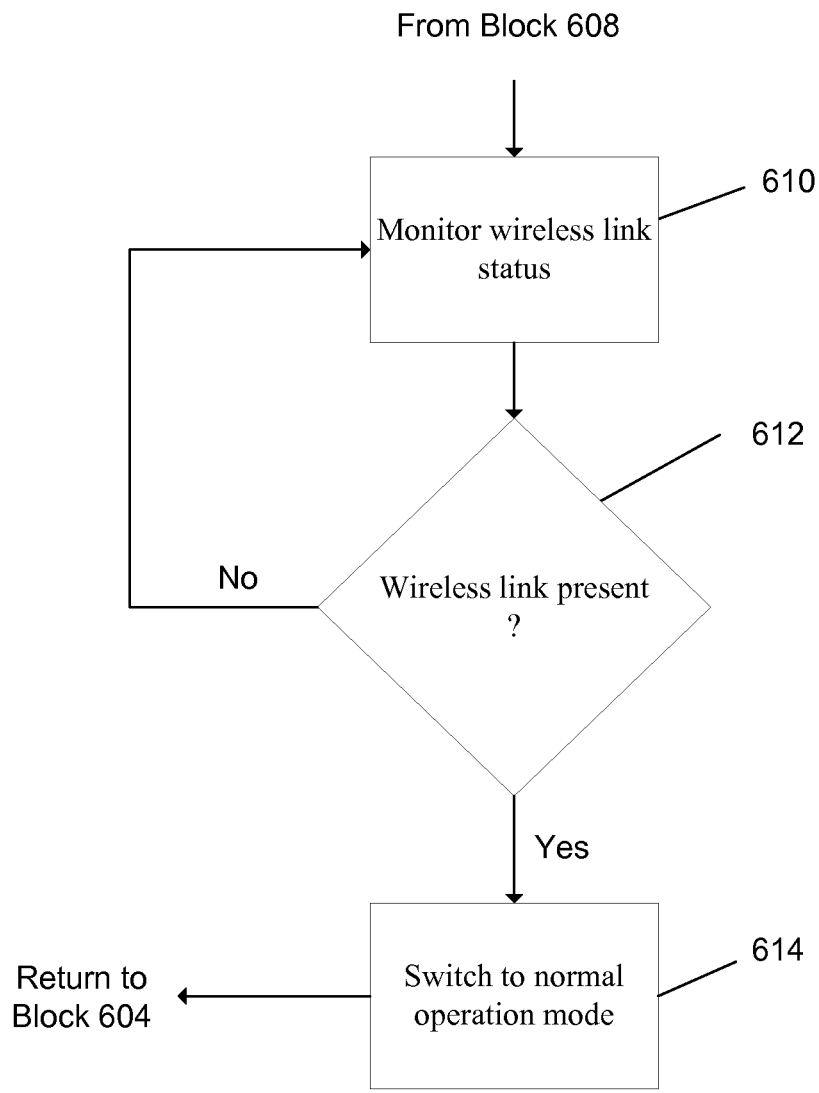

FIGS. 6A-6B are a flowchart illustrating a process by which power management is implemented at a computing device by monitoring a link connection status with a wireless communication device. At block 602, a wireless link is formed with a wireless communication device. For example, where the wireless communication device is a Bluetooth enabled device, the wireless link may be a Bluetooth asynchronous connectionless link (ACL). At block 604, the wireless link status is monitored. At decision block 606, it is determined whether a wireless link is present. If yes at decision block 606, the process returns to block 604. If no at decision block 606, at block 608, a switch to power conservation mode is made. At block 610, the wireless link status is monitored. At decision block 612, is determined whether a wireless link is present. If no at decision block 612, the process returns to block 610. If yes at decision block 612, a switched to normal operation mode is made. Following block 614, the process returns to block 604.

Figure 7A:
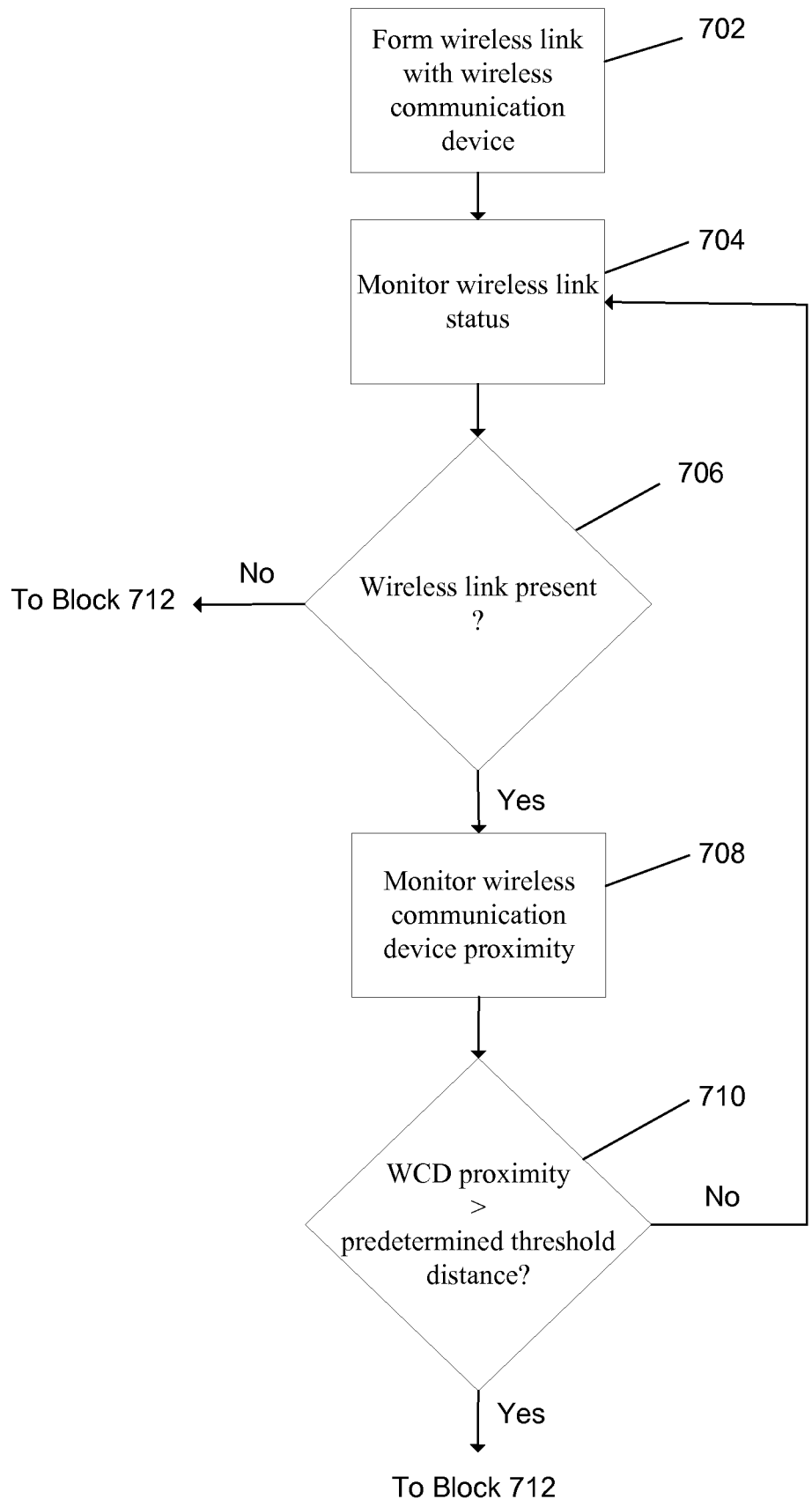
FIGS. 7A-7C are a flowchart illustrating a process by which power management is implemented by monitoring both a wireless communication device proximity and monitoring a link connection status.
Figure 7B:
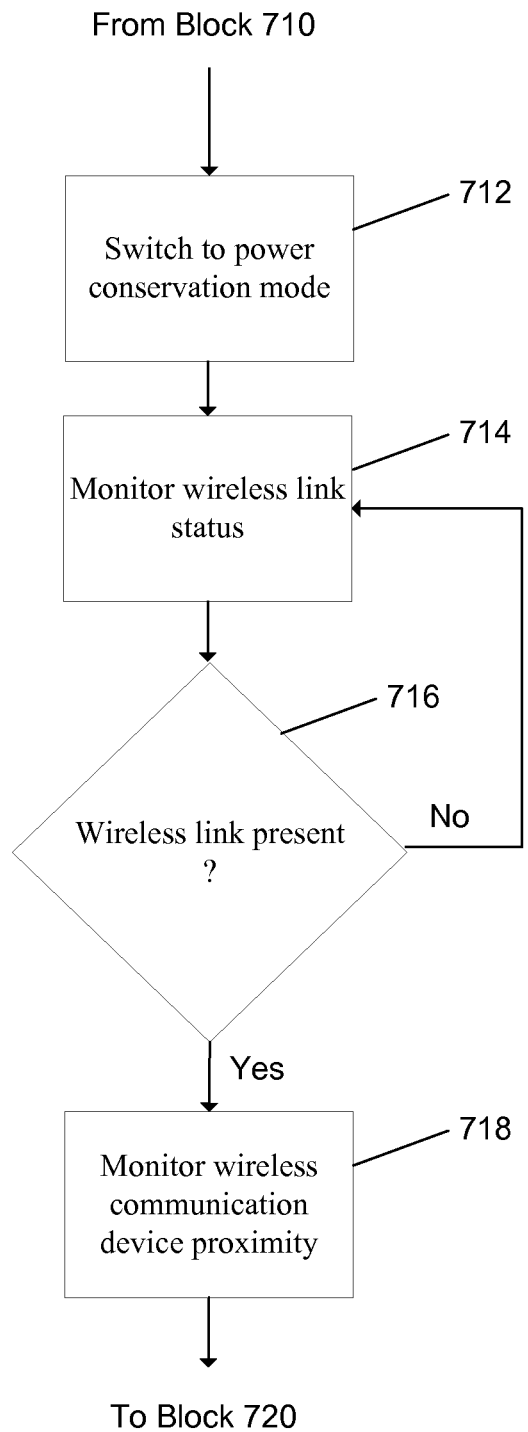
Figure 7C:
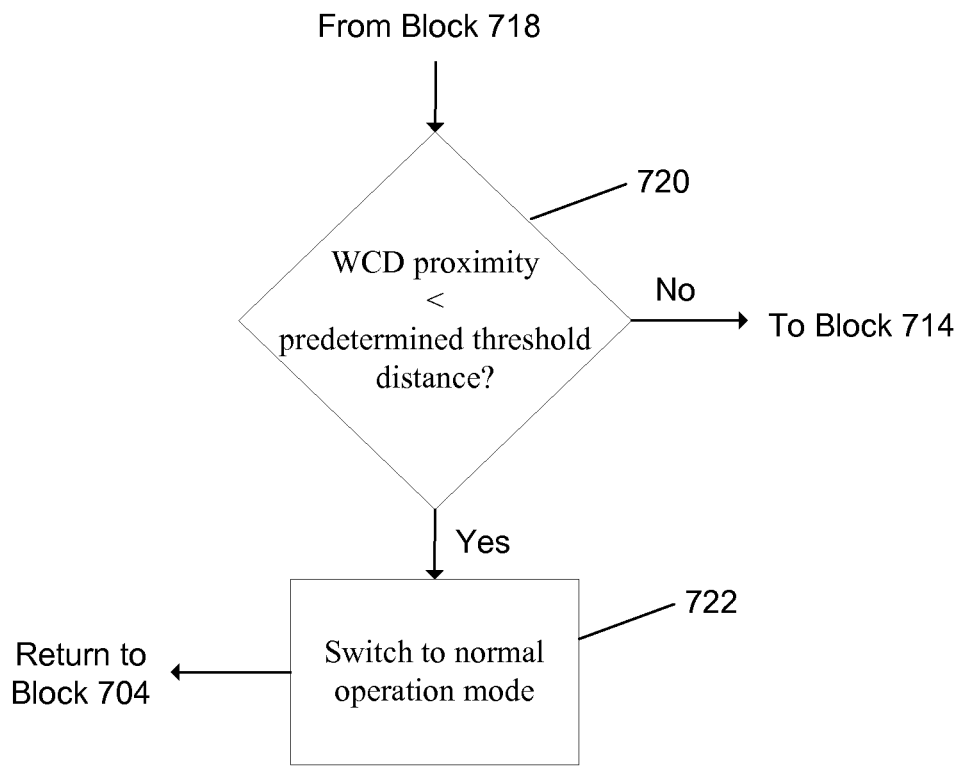

FIGS. 7A-7C are a flowchart illustrating a process by which power management is implemented at a computing device by monitoring both a wireless communication device proximity and monitoring a link connection status.

At block 702, a wireless link is formed with a wireless communication device. At block 704, the wireless link status is monitored. At decision block 706, it is determined whether a wireless link is present. If no at decision block 706, the process proceeds to block 712. If yes at decision block 706, at block 708, the wireless communication device proximity is monitored. At decision block 710, it is determined whether the wireless communication device proximity is greater than a predetermined threshold distance. If no at decision block 710, the process returns to block 704. If yes at decision block 710, at block 712, a switch to power conservation mode is made. At block 714, the wireless link status is monitored. At decision block 716, it is determined whether the wireless link is present. If no at decision block 716, the process returns to block 714. If yes at decision block 716, at block 718, the wireless communication device proximity is monitored. At decision block 720, it is determined whether the wireless communication device proximity is less than a predetermined threshold distance. If no at decision block 720, the process returns to block 714. If yes at decision block 720, at block 722, a switch is made to normal operation mode. Following block 722, the process returns to block 704.

Figure 8:
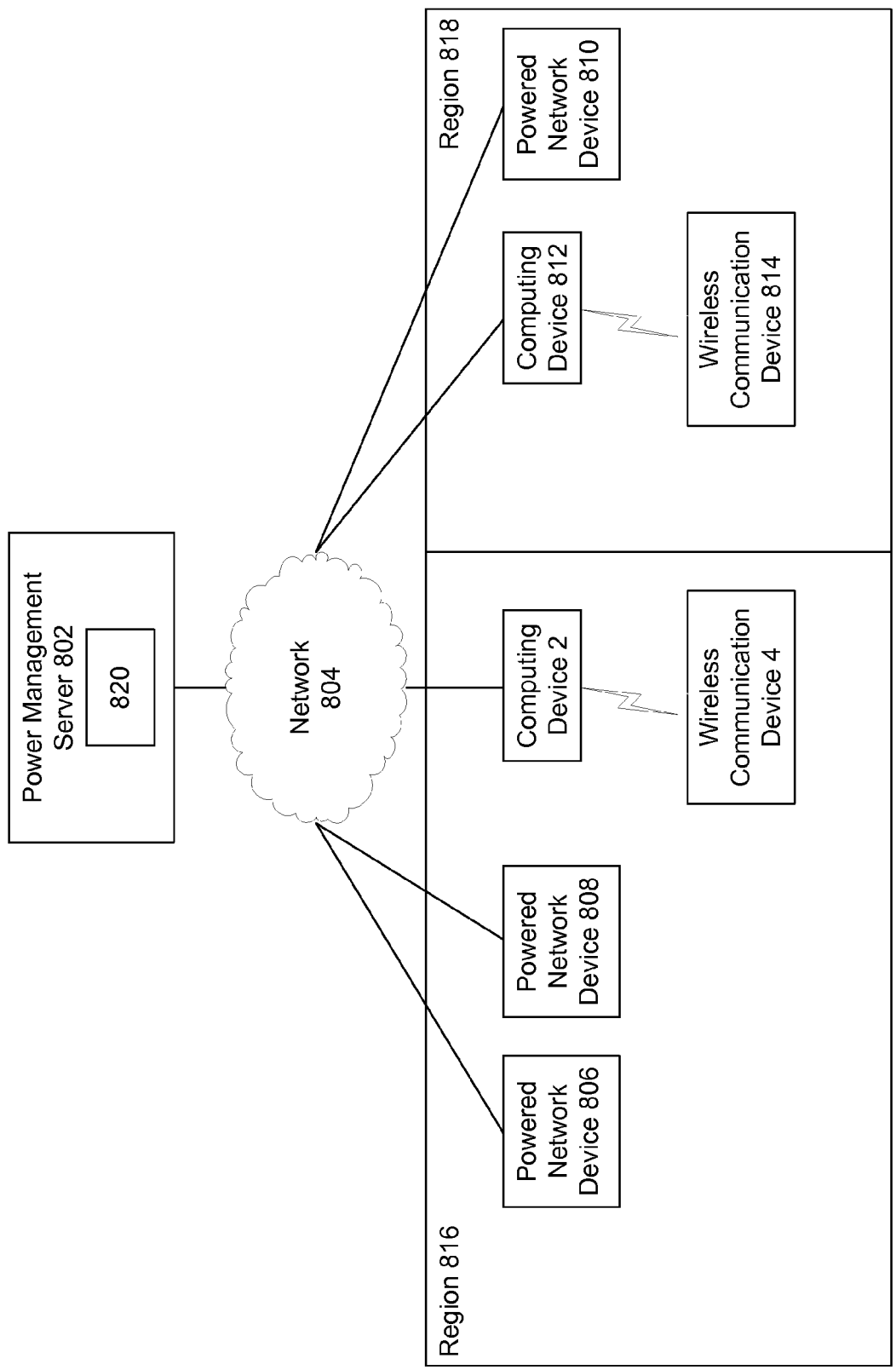
FIG. 8 illustrates power management system utilizing a networked power management server.

FIG. 8 illustrates a power management system utilizing a networked power management server in one example usage scenario. The power management system includes a power management server 802 coupled to a network 804. Residing on power management server 802 is a power management application 820. Disposed in a geographic region 816 is a computing device 2 wirelessly linked to a wireless communication device 4 as described above. Computing device 2 is also connected to network 804. Also disposed in geographic region 816 is a powered network device 806 and a powered network device 808. Both powered network device 806 and powered network device 808 are connected to network 804. For example, powered network device 806 and powered network device 808 may be a networked copier, printer, or lighting system.

In this example, computing device 2 includes a monitoring application configured to monitor a wireless communication device proximity utilizing RSSI values associated with the wireless link to the wireless communication device 4, and responsive to the wireless communication device proximity generate a normal operation mode status indicator or a power conservation mode status indicator. The normal operation mode status indicator or power conservation mode status indicator is sent to power management server 802. In one example, the monitoring application is configured to operate a device component at the computing device 2 in a low power state responsive to a power conservation mode status indicator.

Power management server 802 with power management application 820 is adapted to receive from the computing device 2 the normal operation mode status indicator or the power conservation mode status indicator and responsively operate one or more powered network devices in a power conservation mode or a normal operation mode. In one example, the power conservation mode includes sending a power a conservation signal from the power management server to the powered network device 806 or powered network device 808.

In a further example, the monitoring application at computing device 2 is further configured to monitor a wireless communication device link connection status with the wireless communication device 4 and responsive to both the wireless communication device link connection status and the wireless communication device proximity, generate a normal operation mode status indicator or a power conservation mode status indicator. The normal operation mode status indicator or power conservation mode status indicator is sent to power management server 802 and utilized as previously described by power management application 820 to operate one or more powered network devices in power conservation mode or normal operation mode.

Disposed in a geographic region 818 is a computing device 812 wirelessly linked to a wireless communication device 814. Computing device 812 is also connected to network 804. Also disposed in geographic region 818 is a powered network device 810 connected to network 804. The computing device 812 includes a monitoring application configured to monitor the wireless communication device 814 proximity utilizing RSSI values associated with the wireless link to the wireless communication device 814, and responsive to the wireless communication device proximity generate a normal operation mode status indicator or a power conservation mode status indicator. The normal operation mode status indicator or power conservation mode status indicator is sent to power management server 802.

In this manner, power management server 802 receives status indicators from computing devices in multiple geographic regions. Based on the status indicators received from each geographic region, the power management application 820 responsively operates the powered network devices in each region in a power conservation mode or a normal operation mode. Using data received from multiple computing devices, power management application 820 can implement power save functions in systems and devices operating across multiple regions. For example, power management application 820 may initiate a power conservation mode in a heating, ventilation, and air conditioning (HVAC) system operating across adjacent geographic region 816 and geographic region 818.

Figure 9:
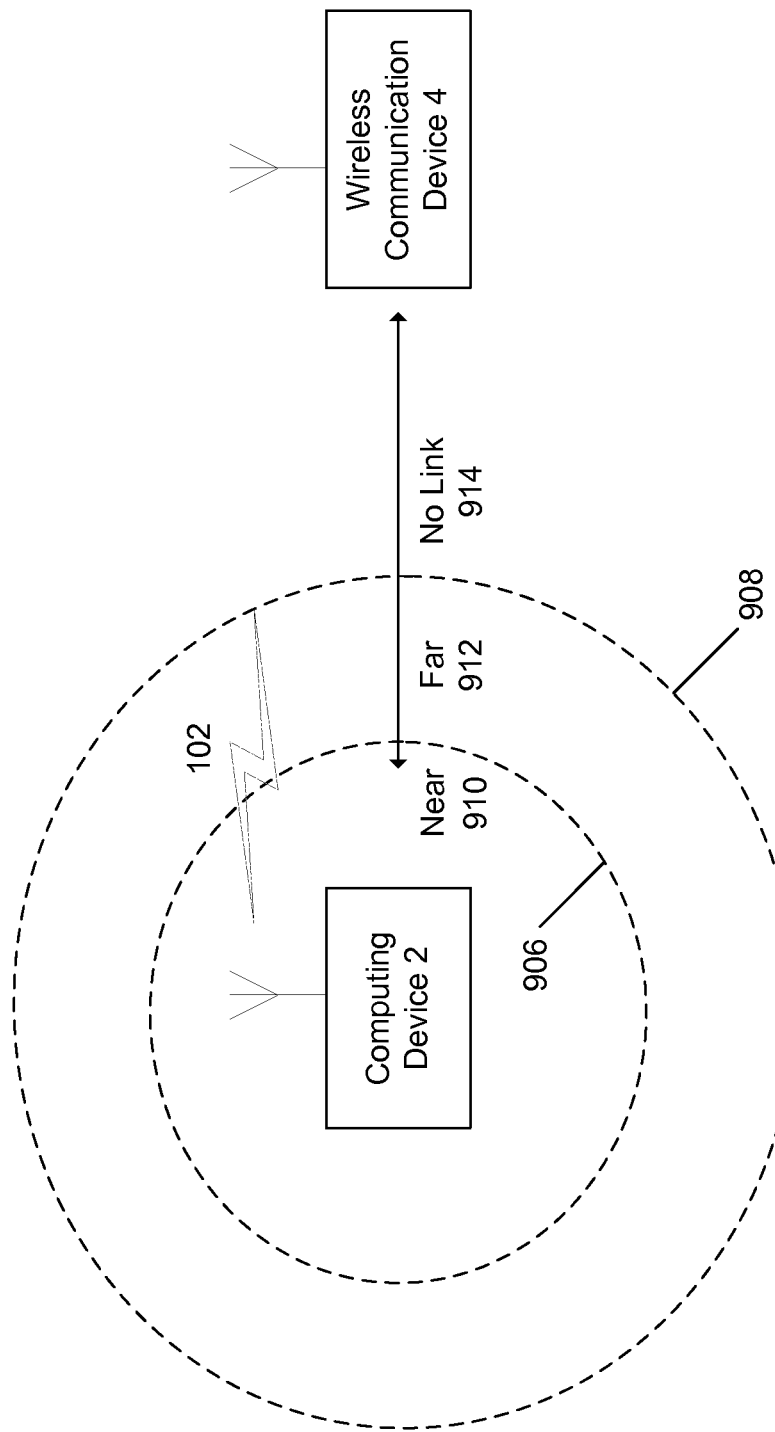
FIG. 9 illustrates a usage scenario for a power management system where a wireless communication device transitions between a NEAR state, FAR state, or No-Link state.

FIG. 9 illustrates an example usage scenario for a power management system where a wireless communication device 4 transitions between a NEAR state, FAR state, or No-Link state. A system 900 includes a computing device 2 and wireless communication device 4 capable of wireless communication there between as previously described. The received signal strength indicator (RSSI) of the wireless link 102 is measured and monitored to determine the proximity of the wireless communication device 4 from the computing device 2.

In system 900, a proximity boundary 906 establishes a range from computing device 2 below which wireless communication device 4 is considered to be in a NEAR state 910 and beyond which wireless communication device 4 is considered to be in a FAR state 912.

A link availability boundary 908 establishes a range from computing device 2 beyond which wireless communication device 4 can no longer maintain wireless link 102. In one example, wireless communication device 4 is a Bluetooth headset operating in class 2 mode. In class 2 mode, wireless communication device 4 has a +4 dBm transmit power and −82 dBm receive sensitivity, resulting in a range of about 10 meters. Thus, in this example, link availability boundary 908 is approximately 10 meters, beyond which the wireless communication device 4 is unable to form a wireless link 102 with computing device 2 and is therefore in a no-link state 914.

System 900 utilizes RSSI values and the link status of link 102 to determine whether wireless communication device 4 is in a NEAR state, FAR state, or no-link state using methods described herein. Responsive to this NEAR/FAR/No-Link determination, computing device 2 initiates either a power conservation mode or a normal operation mode. The power management system may be automatically configured or the user may select that the power management operate based on NEAR/FAR status, link status, or both NEAR/FAR and link status.

In one example embodiment, a computing device includes a wireless transceiver configured to receive a wireless signal from a first wireless communication device over a first wireless communications link, wherein the first wireless communication device is operable to form a second wireless communications link with a second wireless communication device. The computing device includes an input/output interface adapted to interface with a peripheral device, and a processor. The computing device further includes a memory storing a power management application configured to receive in the wireless signal from the first wireless communication device an indication of a link connection status of the second wireless communications link, and responsive to the link connection status of the second wireless communications link operate the computing device in a normal operation mode or a power conservation mode.

In one example embodiment, a method for power conservation includes receiving at a computing device a data associated with a link connection status between a first wireless communication device and a second wireless communication device. The method includes operating the computing device in a power conservation mode responsive to the data indicating the link connection status is a no-link status. The method further includes operating the computing device in a normal operation mode responsive to the data indicating the link connection status is a linked status.

Figure 10:
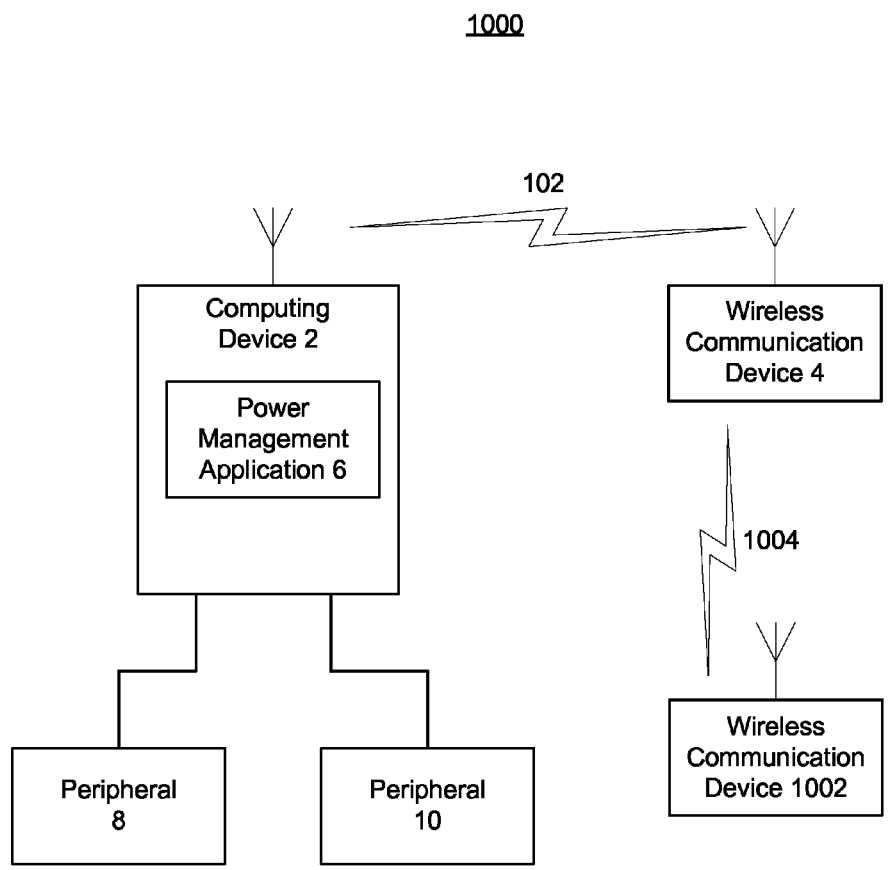
FIG. 10 illustrates an example system for power management using a computing device in a further example.

FIG. 10 illustrates an example system 1000 for power management using a computing device 2 in wireless communication with a wireless communication device 4 over a wireless communications link 102. Wireless communication device 4 is also operable to form a wireless communications link 1004 with a wireless communication device 1002.

The computing device 2 includes a power management application 6. In the example shown in FIG. 10, computing device 2 interfaces with a peripheral device 8 and peripheral device 10. Although only two peripheral devices are shown, computing device 2 may interface with any number of peripheral devices. Wireless communications link 102 and wireless communications link 1004 may be implemented using a variety of wireless communication protocols including, for example, Bluetooth, digital enhanced cordless telecommunications (DECT), IEEE 802.11, or infrared (IR). Peripheral device 8 and peripheral device 10 are any type of device which may be connected to a computing device and include, for example, printers and display devices. Computing device 2 may, for example, be a desktop computer or laptop computer. Wireless communication device 4 may, for example, be a wireless headset or a mobile phone. In one example, wireless communication device 4 is a wireless headset and wireless communication device 1002 is a mobile phone.

In one example mode of operation, the power management application 6 is configured to receive from the wireless communication device 4 an indication of a link connection status of the wireless communications link 1004, and responsive to the link connection status of the wireless communications link 1004 operate the computing device 2 in a normal operation mode or a power conservation mode. In one example, the computing device 2 is operated in the normal operation mode when the link connection status is a linked status and is operated in the power conservation mode when the link connection status is a no-link status. In one example, the power conservation mode includes sending a power conservation signal to the peripheral device 8 and/or peripheral device 10. The computing device 2 may further include a powered device component, wherein the power conservation mode includes operating the powered device component in a low power state. In a further example mode of operation, the power management application 6 is further configured to monitor a link connection status of the wireless communications link 102 with the wireless communication device 4, and responsive to the link connection status of the wireless communications link 102 operate the computing device 2 in a normal operation mode or a power conservation mode.

Figure 11:
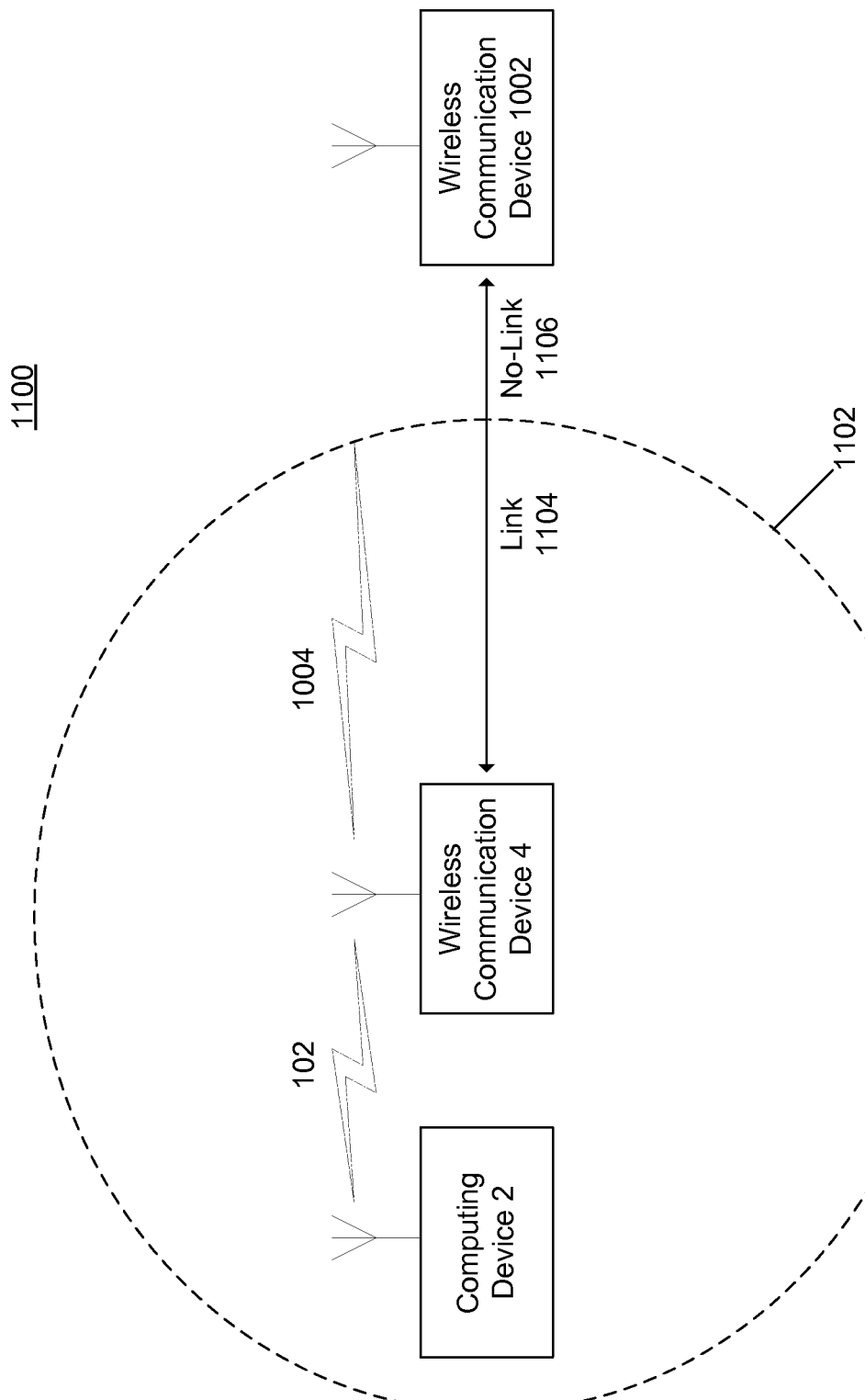
FIG. 11 illustrates an example usage scenario for a power management system where a wireless communication device transitions between a Linked state and a No-Link state.

FIG. 11 illustrates an example usage scenario for a power management system where a wireless communication device 1002 transitions between a Linked state 1104 and a No-Link state 1106 with a wireless communication device 4. A system 1100 includes a computing device 2 and wireless communication device 4 capable of wireless communication there between, where wireless communication device 4 is also capable of wireless communications with wireless communication device 1002 as previously described.

In system 1100, a link availability boundary 1102 establishes a range from wireless communication device 4 beyond which wireless communication device 1002 can no longer maintain wireless communications link 1004. In one example, wireless communication device 4 and wireless communication device 1002 are Bluetooth devices operating in class 2 mode. In class 2 mode, wireless communication device 1002 has a +4 dBm transmit power and −82 dBm receive sensitivity, resulting in a range of about 10 meters. Thus, in this example, link availability boundary 1102 is approximately 10 meters, beyond which the wireless communication device 1002 is unable to form a wireless communications link 1004 with wireless communication device 4 and is therefore in a No-Link state 1106. Responsive to the data received from wireless communication device 4 over wireless communications link 102 indicating whether wireless communication device 1002 is in a Linked state 1104 or No-Link state 1106, computing device 2 operates in either a power conservation mode or a normal operation mode.

Figure 12:
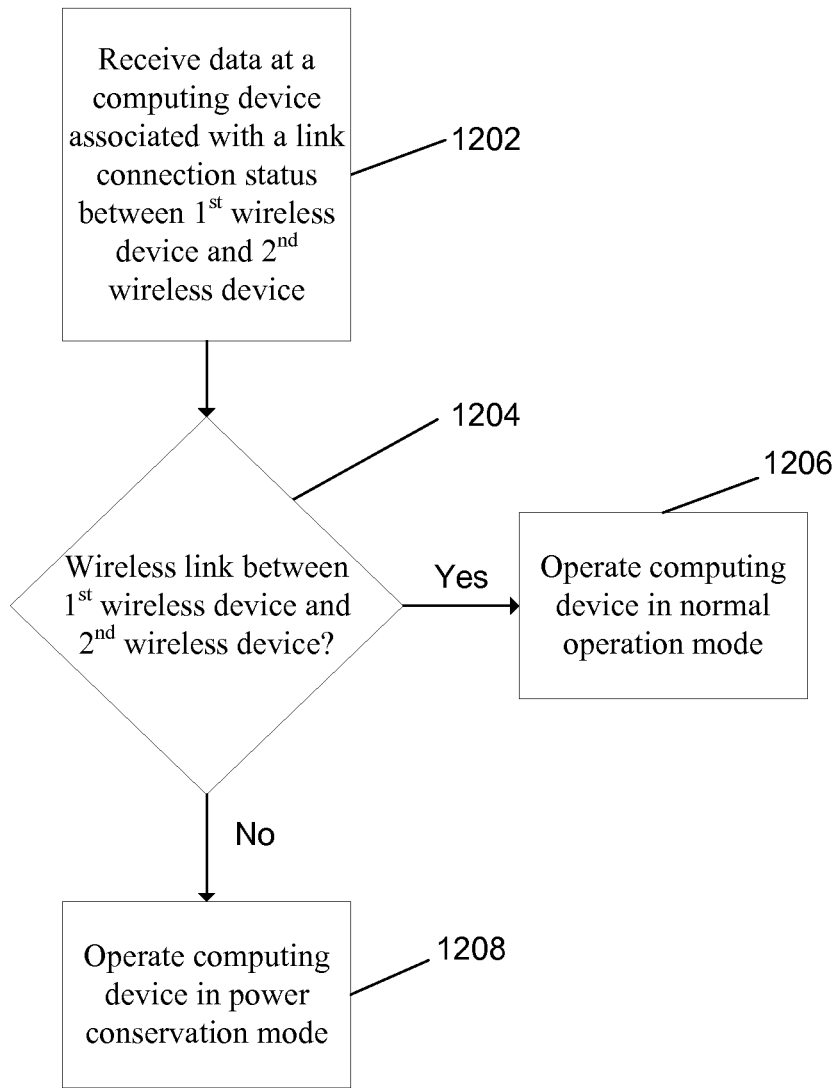
FIG. 12 is a flowchart illustrating a process for power conservation in one example.

FIG. 12 is a flowchart illustrating a process for power conservation. At block 1202, data is received at a computing device associated with a link connection status between a first wireless communication device and a second wireless communication device. In one example, the computing device is a desktop computer or a laptop computer. In one example, the first wireless communication device is a headset and the second wireless communication device is a mobile phone.

At decision block 1204, it is determined whether there is a wireless link between the first wireless communication device and the second wireless communication device. If yes at decision block 1204, at block 1206 the computing device is operated in a normal operation mode.

If no at decision block 1204, at block 1208 the computing device is operated in a power conservation mode. In one example, operating the computing device in a power conservation mode includes sending a power conservation signal to a peripheral device coupled to the computing device. In one example, operating the computing device in a power conservation mode includes initiating a low power operation mode of a computing device powered component.

In one example, the process further includes monitoring at the computing device a link connection status between the computing device and the first wireless communication device. The computing device is operated in a power conservation mode responsive to the link connection status between the computing device and the first wireless communication device being a no-link status. The computing device is operated in a normal operation mode responsive to the link connection status between the computing device and the first wireless communication device being a linked status. In a further example, the computing device is operated in the power conservation mode or the normal operation mode responsive to a proximity of the first wireless communication device to the computing device.

While the exemplary embodiments of the present invention are described and illustrated herein, it will be appreciated that they are merely illustrative and that modifications can be made to these embodiments without departing from the spirit and scope of the invention. For example, methods and apparatuses for determining proximity of wireless communication devices may be varied. Furthermore, although certain examples are set forth specifying RSSI processing techniques to identify a wireless communication device proximity, other techniques may be employed in further examples of the invention. Thus, the scope of the invention is intended to be defined only in terms of the following claims as may be amended, with each claim being expressly incorporated into this Description of Specific Embodiments as an embodiment of the invention.

What is claimed is:

1. A computing device comprising:
   a wireless transceiver configured to receive a wireless signal from a wireless first wireless communication device over a first wireless communications link, wherein the wireless first wireless communication device is operable to form a second wireless communications link with a wireless second wireless communication device;
   an input/output interface adapted to interface with a peripheral device;
   a processor; and
   a memory storing a power management application configured to receive in the wireless signal from the wireless first wireless communication device an indication of a link connection status of the second wireless communications link and responsive to the link connection status of the second wireless communications link operate the computing device in a normal operation mode or a power conservation mode, the link connection status of the second wireless communications link dependent upon movement of the wireless second wireless communication device with respect to a link boundary with the first wireless communication device.

2. The computing device of claim 1, wherein the computing device is operated in the normal operation mode when the link connection status is a linked status and operated in the power conservation mode when the link connection status is a no-link status.

3. The computing device of claim 1, wherein the power conservation mode comprises sending a power conservation signal to the peripheral device.

4. The computing device of claim 3, wherein the peripheral device is a display or printer.

5. The computing device of claim 1, further comprising a powered device component, wherein the power conservation mode comprises operating the powered device component in a low power state.

6. The computing device of claim 1, wherein the power management application is further configured to monitor a link connection status of the first wireless communications link with the first wireless communication device and responsive to the link connection status of the first wireless communications link operate the computing device in the normal operation mode or the power conservation mode.

7. The computing device of claim 1, wherein the first wireless communication device is a headset and the second wireless communication device is a mobile phone.

8. The computing device of claim 1, wherein the link boundary is approximately 12 meters from the first wireless device.

9. The computing device of claim 1, wherein the second wireless communications link comprises a Bluetooth link, Digital Enhanced Cordless Telecommunications link, IEEE 802.11 link, or infrared link.

10. A method for power conservation comprising:
receiving at a computing device a data associated with a link connection status associated with a wireless communications link between a wireless first wireless communication device and a wireless second wireless communication device, the link connection status dependent upon movement of the wireless second wireless communication device with respect to a link boundary with the first wireless communication device;
operating the computing device in a power conservation mode responsive to the data indicating the link connection status is a no-link status; and
operating the computing device in a normal operation mode responsive to the data indicating the link connection status is a linked status.

11. The method of claim 10, wherein operating the computing device in the power conservation mode comprises sending a power conservation signal to a peripheral device coupled to the computing device.

12. The method of claim 10, wherein operating the computing device in the power conservation mode comprises initiating a low power operation mode of a computing device powered component.

13. The method of claim 10, further comprising:
monitoring at the computing device a link connection status between the computing device and the first wireless communication device;
operating the computing device in the power conservation mode responsive to the link connection status between the computing device and the first wireless communication device being a no-link status; and
operating the computing device in the normal operation mode responsive to the link connection status between the computing device and the first wireless communication device being a linked status.

14. The method of claim 10, wherein the first wireless communication device is a headset and the second wireless communication device is a mobile phone.

15. The method of claim 10, wherein the computing device is a desktop computer or a laptop computer.

16. The method of claim 10, further comprising operating the computing device in the power conservation mode or the normal operation mode responsive to a proximity of the first wireless communication device to the computing device.

17. The method of claim 10, wherein the link boundary is approximately 10 meters from the first wireless device.

18. The method of claim 10, wherein the wireless communications link comprises a Bluetooth link, Digital Enhanced Cordless Telecommunications link, IEEE 802.11 link, or infrared link.

19. A non-transitory computer-readable storage media having computer-executable instructions stored thereon which, when executed by a computer, cause the computer to perform operations comprising:
receiving at a computing device a data associated with a link connection status associated with a wireless communications link between a wireless first wireless communication device and a wireless second wireless communication device, the link connection status dependent upon movement of the wireless second wireless communication device with respect to a link boundary with the first wireless communication device;
operating the computing device in a power conservation mode responsive to the data indicating the link connection status is a no-link status; and
operating the computing device in a normal operation mode responsive to the data indicating the link connection status is a linked status.

20. The non-transitory computer-readable storage media of claim 19, wherein operating the computing device in the power conservation mode comprises sending a power conservation signal to a peripheral device coupled to the computing device.

21. The non-transitory computer-readable storage media of claim 19, wherein operating the computing device in the power conservation mode comprises initiating a low power operation mode of a computing device powered component.

22. The non-transitory computer-readable storage media of claim 19, wherein the operations further comprise:
monitoring at the computing device a link connection status between the computing device and the first wireless communication device;
operating the computing device in the power conservation mode responsive to the link connection status between the computing device and the first wireless communication device being a no-link status; and
operating the computing device in the normal operation mode responsive to the link connection status between the computing device and the first wireless communication device being a linked status.

23. The non-transitory computer-readable storage media of claim 19, wherein the first wireless communication device is a headset and the second wireless communication device is a mobile phone.

24. The non-transitory computer-readable storage media of claim 19, wherein the computing device is a desktop computer or a laptop computer.

25. The non-transitory computer-readable storage media of claim 19, wherein the operations further comprise: operating the computing device in the power conservation mode or the normal operation mode responsive to a proximity of the first wireless communication device to the computing device.

* * * * *